US008090903B2

(12) United States Patent
Bernardi et al.

(10) Patent No.: US 8,090,903 B2
(45) Date of Patent: Jan. 3, 2012

(54) FAIR AND DYNAMIC DISK INPUT/OUTPUT BANDWIDTH DISTRIBUTION

(75) Inventors: Ara Bernardi, Mercer Island, WA (US); Nelamangal Krishnaswamy Srinivas, Sammamish, WA (US); Ashwin Palekar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 12/016,901

(22) Filed: Jan. 18, 2008

(65) Prior Publication Data

US 2009/0187705 A1 Jul. 23, 2009

(51) Int. Cl.
*G06F 12/00* (2006.01)
(52) U.S. Cl. .. 711/112; 711/113; 711/167; 711/E12.035
(58) Field of Classification Search ............... None
See application file for complete search history.

(56) References Cited

U.S. PATENT DOCUMENTS

| | | | |
|---|---|---|---|
| 5,220,653 A | 6/1993 | Miro | |
| 5,644,786 A | 7/1997 | Gallagher et al. | |
| 5,987,479 A | 11/1999 | Oliver | |
| 6,430,592 B1 * | 8/2002 | Davison | 718/103 |
| 6,434,631 B1 | 8/2002 | Bruno et al. | |
| 6,480,904 B1 * | 11/2002 | Kato et al. | 710/6 |
| 6,574,676 B1 | 6/2003 | Megiddo | |
| 6,715,006 B1 | 3/2004 | Hotta et al. | |
| 6,721,789 B1 | 4/2004 | DeMoney | |
| 7,165,140 B2 | 1/2007 | Dandrea et al. | |
| 7,197,577 B2 | 3/2007 | Nellitheertha | |
| 7,206,866 B2 | 4/2007 | Hendel et al. | |
| 7,543,125 B2 * | 6/2009 | Gokhale | 711/162 |
| 2008/0244209 A1 * | 10/2008 | Seelam et al. | 711/168 |

OTHER PUBLICATIONS

Handling IRPs: What every driver writer should know; Microsoft Corporation; Jul. 31, 2006; pp. 2-4.*
Iyer, et a., "Anticipatory Scheduling: A Disk Scheduling Framework to Overcome Deceptive Idleness in Synchronous I/O", found at http://www.cs.rice.edu/~ssiyer/r/antsched/antsched.pdf>>, ACM SIGOPS Operating Systems Review, vol. 35, Issue 5, Dec. 2001, 14 pgs.
Welsh, "The Staged Event-Driven Architecture for Highly-Concurrent Server Applications", Nov. 2000, found at http://avindev.googlepages.com/quals-seda.pdf>>, PhD thesis, UC Berkeley, 20 pgs.

* cited by examiner

*Primary Examiner* — Reginald Bragdon
*Assistant Examiner* — Aracelis Ruiz
(74) *Attorney, Agent, or Firm* — Lee & Hayes, PLLC

(57) ABSTRACT

Embodiments that facilitate the fair and dynamic distribution of disk input/output (IO) bandwidth are disclosed. In accordance with one embodiment, the method includes organizing one or more disk IO time intervals into one or more queues. The method further includes allocating a disk IO time interval to each queue. The allocation of a disk IO time interval to each queue is accomplished by equally distributing a disk IO cycle based on the number of queues. The one or more disk IO requests are then processed during the corresponding disk IO time interval.

20 Claims, 7 Drawing Sheets

FAIR AND DYNAMIC DISK INPUT/OUTPUT BANDWIDTH DISTRIBUTION

BACKGROUND

Disk input/output (IO) refers to the interactions of software applications with a hardware data storage device such as a hard drive. Disk IO enables software applications to store and retrieve data to and from the hardware data storage device. In a computing system, the hardware data storage device typically receives a plurality of disk IO requests from various software applications. Disk IO scheduling mechanisms are implemented so that the hardware data storage device may respond to each of the disk IO requests.

Current disk IO scheduling mechanisms are generally based on disk IO bandwidth reservation or priority queues. For example, disk IO requests may be queued by a disk IO manager of an operating system in the order that they are received, and then execute sequentially. In other examples, the disk IO manager may queue and execute each of the received disk IO requests according to priority.

These disk IO mechanisms may fall short of providing fair disk IO response to all users in a multi-user environment where a plurality of users are access data stored on the same hardware data storage device. For instance, a first user may use more software applications than a second user, resulting in more disk IO bandwidth being devoted to the first user than the second user. In scenarios where some users are using significantly more software applications than other users, such imbalance in disk IO bandwidth distribution may cause poor computing experience for those users that are receiving inadequate disk IO bandwidth.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various technologies for implementing fair and dynamic distribution of disk input/output (IO) bandwidth to users in a multi-user environment. In at least one embodiment, the method includes organizing one or more disk IO requests into one or more queues. The method further includes allocating a disk IO time interval to each queue. The allocation of a disk IO time interval to each queue is accomplished by equally distributing a disk IO cycle based on the number of queues. The one or more disk IO requests are then processed during the corresponding disk IO time interval.

In another embodiment, a computer readable medium having computer-executable instructions that, when executed, perform acts that include organizing one or more disk IO requests into one or more queues. The acts also include allocating a disk IO time interval to each queue. The allocation of a disk IO time interval to each queue is accomplished by equally, or substantially equally, distributing a disk IO cycle based on a quantity of the one or more queues. The acts further comprise dividing the disk IO time interval allocated to each queue into identical time slices. The duration of a disk IO time slice in each of the queues being identical. The acts additionally include providing one or more additional portions of the disk IO cycle to a first queue that has consumed its corresponding time interval. In a further embodiment, the acts also comprise processing the one or more disk IO requests in each queue for a corresponding second time slice.

In an additional embodiment, a system for dynamically distributing disk IO bandwidth to multiple queues comprises one or more processors. The system also comprises memory to store a plurality of computer-executable instructions that are executable by the one or more processors. The computer-executable instructions comprise instructions for organizing one or more disk IO requests into one or more queues based on at least one criterion. The computer-executable instructions also comprise instructions for allocating a corresponding disk IO time interval to each queue. The allocation of a disk IO time interval to each queue is accomplished by equally distributing a disk IO cycle based on a quantity of the one or more queues. The computer-readable instructions further comprise instructions for processing the one or more disk IO requests in each queue during the corresponding disk IO time interval. Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

This disclosure is directed to systems and methods that facilitate fair and dynamic distribution of disk input/output (IO) bandwidth each of a plurality of queues. Specifically, the embodiments in this disclosure are directed to allocating disk IO bandwidth equally to each queue, or some other grouping of disk IO requests, rather than to each disk IO request. It will be appreciated that a least a portion of a disk IO bandwidth in a disk IO cycle is generally reserved for operating system functionalities. Accordingly, as used herein, the disk IO bandwidth refers to an available disk IO bandwidth that is not used for system functionalities. For instance, the disk IO bandwidth may be around approximately 70% of a total disk IO bandwidth.

The embodiments in this disclosure are also directed toward dynamically allocating disk IO bandwidth based on the number of queues. In this way, embodiments described herein may ensure a distribution of disk IO bandwidth that does not cause application hesitations or slow downs that negatively impact users in a multi-user environment. Various examples of facilitating fair and/or dynamic distribution of disk IO bandwidth for all users in a multi-user environment are described below with reference to FIGS. 1-7.

Exemplary Grouping Scheme

Figure 1:
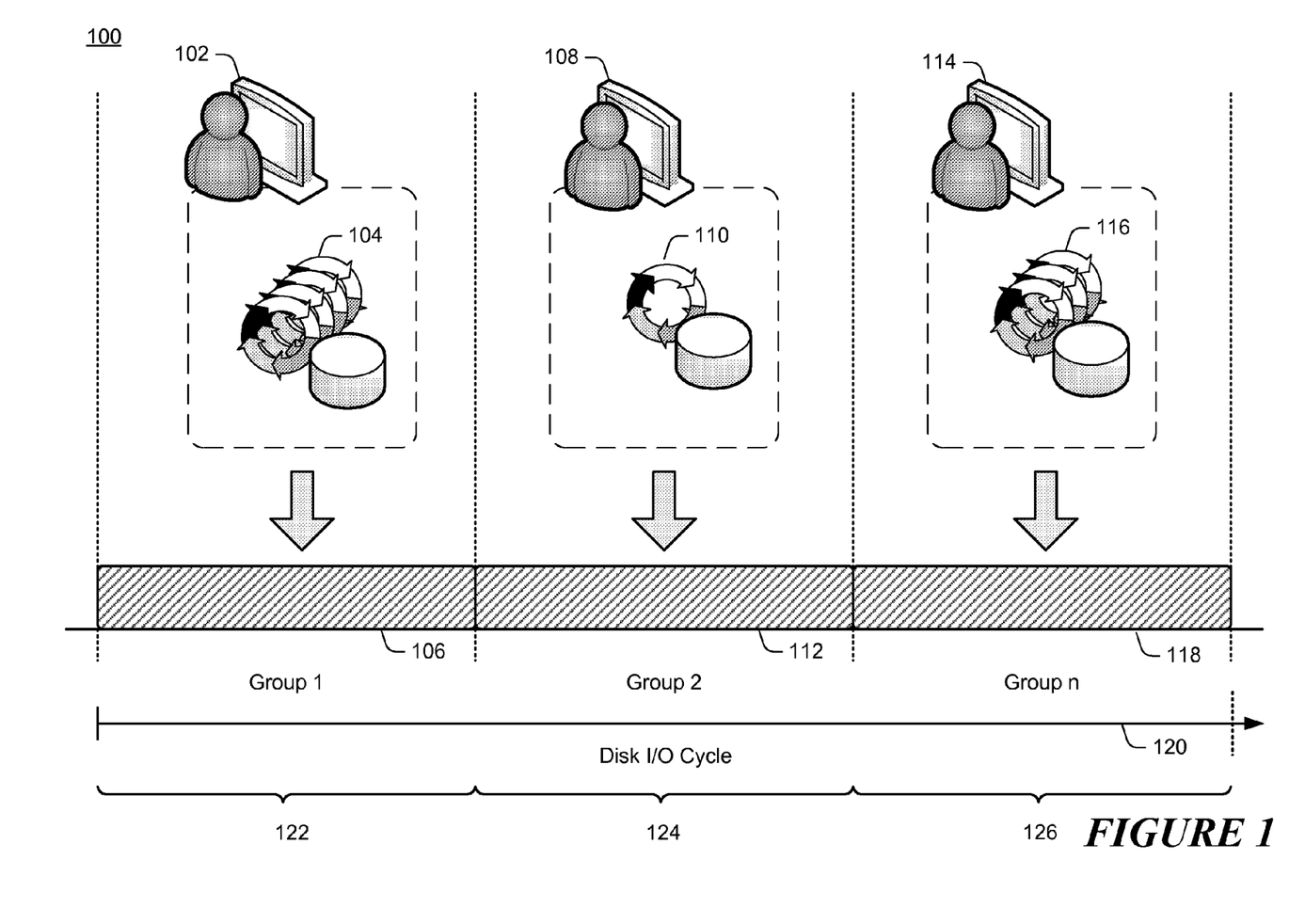
FIG. 1 is a block diagram illustrating an exemplary scheme for organizing processes into queues for fair and dynamic disk input/output (IO) bandwidth allocation.

FIG. 1 illustrates an exemplary scheme for organizing disk input/output (IO) requests into queues according to a classification criterion, in accordance with at least one embodiment of fair and dynamic disk IO bandwidth distribution. The organization of disk IO requests into queues, in accordance one or more embodiments of fair and dynamic disk IO bandwidth distribution, may alleviate impaired performances that cause degraded user experiences. In an exemplary embodiment, disk IO requests may be formed into queues according to the users they serve. For example, a user 102, such as an employee of a company, may be using at least one software application that employs disk IO requests 104. The disk IO requests 104 are organized into a queue 106. Moreover, a user 108 may be using at least one software application that employs a disk IO request 110. The disk IO request 110 is organized into a queue 112. Likewise, a user 114 may be using at least one application that employs a plurality of disk IO requests 116 (which may not be as numerous as the disk IO requests 104). The disk IO requests 116 are organized into queue 118.

A disk IO cycle, such as the disk IO cycle 120, may then be divided into disk IO time intervals that reflect the number of queues. In this way, each queue receives an equal share, or a substantially equal share, of the disk IO cycle regardless of the number of disk IO requests in the queue. For example, the disk IO cycle may be allocated into time intervals 122, 124 and 126 to equally distribute the processing time of the disk IO cycle 120 to the organized queues 106, 112, and 118. Accordingly, disk IO queue 112 is configured to receive the same or substantially equivalent amount of disk IO bandwidth as queues 106 and 118, even though queue 112 includes only disk IO request 110 while queues 106 and 118 each include multiple disk IO requests 104 and 116, respectively. Thus, the equal or substantially equal distribution of disk IO bandwidth to each queue, wherein each queue includes different number of disk IO requests, may ensure that each queue is provided with adequate disk IO bandwidth so that a user does not experience hesitation or delay of the applications. In embodiments where the software applications are running in a WINDOWS® operating system, the disk IO requests may be contained in IO request packets (IRPs). Accordingly, IRPs may be treated in the same fashion as disk IO requests in those embodiments.

It will be appreciated that while the embodiment above describes the grouping of disk IO requests according to the users they service, disk IO requests may also be grouped according to other classification criteria. For instance, in some embodiments, the processes may be organized so that disk IO requests that act on multimedia content are in a first queue, while disk IO requests that do not act on media content are in a second queue. Other embodiments may include queue organizations based on other classification criteria, so long as the disk IO requests are organized into distinct queues.

Exemplary Disk IO Scheduler

Figure 2:
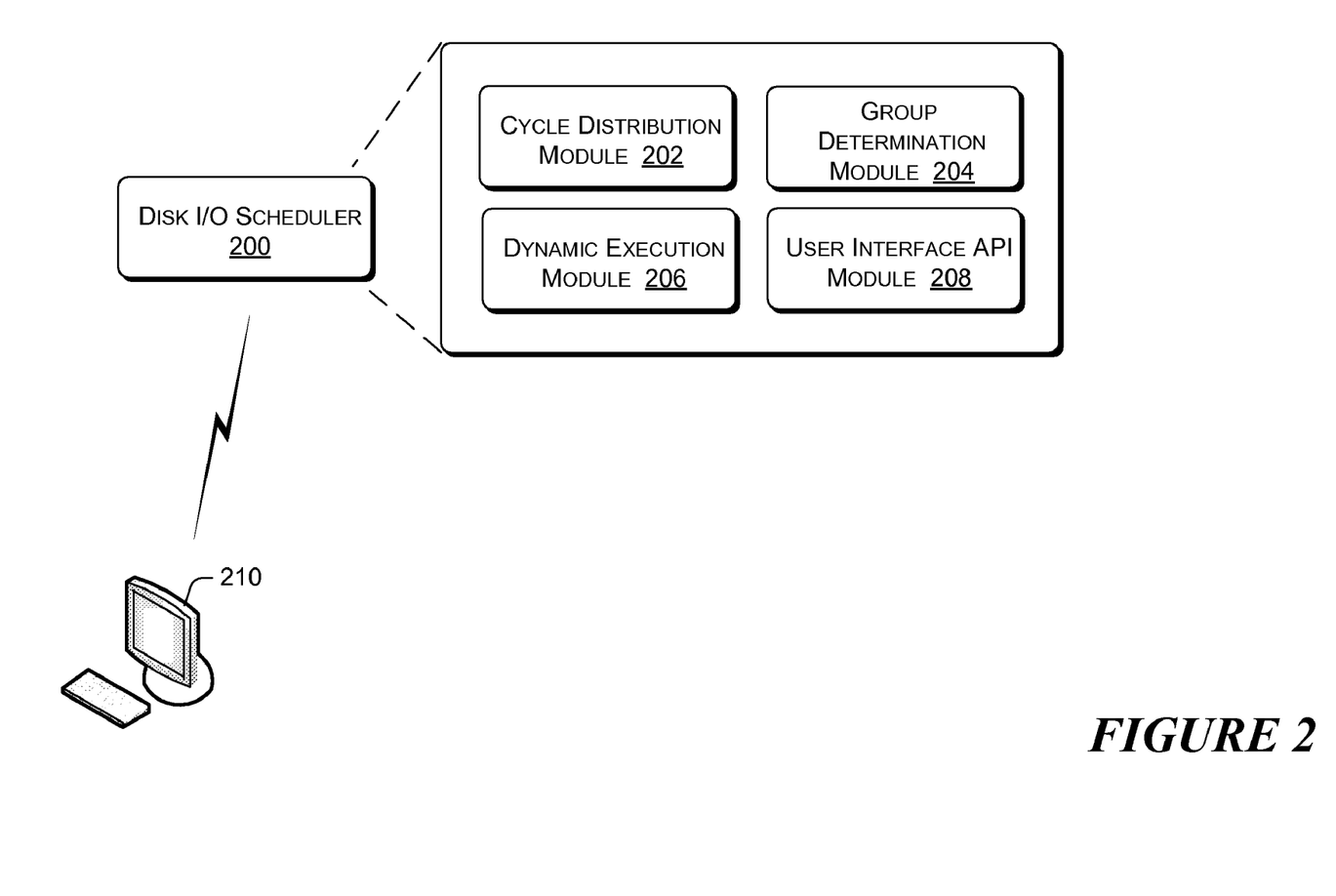
FIG. 2 is a block diagram illustrating selected components of an exemplary disk IO scheduler that is configured to provide disk input/output (IO) bandwidth to each queue, in accordance with at least one embodiment.

FIG. 2 is a block diagram illustrating selected components of an exemplary disk IO scheduler 200 that is configured to provide disk input/output (IO) bandwidth to each queue, in accordance with at least one embodiment of fair and dynamic disk IO bandwidth distribution. The exemplary disk IO scheduler 200 may include computer program instructions that are executed by a computing device, such as the device 700 described in FIG. 7. Program instructions, or modules, may include routines, programs, objects, components, and data structures that perform particular tasks or implement particular abstract data types. The selected components of the disk IO scheduler 200 include, but are not limited to, a cycle distribution module 202, a queue determination module 204, a dynamic execution module 206, and a user interface application program interface (API) module 208.

The cycle distribution module 202 may be configured to distribute a disk IO cycle equally, or substantially equally, among a plurality of queues that need disk IO bandwidth. Each queue may include a different number of disk IO requests. For example, if t represents the time in a disk IO cycle and n represents the number of queues, the cycle distribution module 202 is configured to allocate the disk IO cycle t into n time intervals such that each time interval has a duration of t/n. The cycle distribution module 202 may also work cooperatively with the queue determination module 204.

The queue determination module 204 may be configured to calculate the number of queues that need disk IO bandwidth in a given disk IO cycle. In one example, this calculation may be performed based on the actual disk IO usage in a previous cycle. According to various embodiments, the queue determination module 204 may perform this calculation by taking into consideration any increase or reduction in the queues of disk IO requests. Once the queue determination module 204 has determined the number of queues that need disk IO bandwidth, the queue determination module 204 may return this information to the cycle distribution module 202.

In turn, the cycle distribution module 202 may reallocate the disk IO cycle to accommodate the change in the number of queues. For example, if t represents the time in a disk IO cycle, n represents the number of queues processed in a disk IO cycle, and the number of queues that need disk IO bandwidth in a subsequent disk IO cycle has increased by one, the cycle distribution module 202 may reallocate the disk IO cycle t into n+1 queues, such that each time interval has a duration of t/(n+1). Likewise, if the queue determination module 204 calculates that the number of queues that need disk IO bandwidth in a subsequent disk IO cycle has decreased by one, then the cycle distribution module 202 reallocate the disk IO cycle such that each time interval has a duration of t/(n−1).

Furthermore, the cycle distribution module 202 may be configured to divide a particular allocated disk IO time interval into a plurality of time slices. The division of a disk IO time interval may enable each queue to receive the disk IO bandwidth more frequently during a specific disk IO cycle. As further described below, the cycle distribution module 202 may also adjust the time slices during a disk IO cycle to accommodate disk IO requests from new queues.

The dynamic execution module 206 may be configured to command a disk manager (not shown) to sequentially fulfill the disk IO requests of each queue during the time interval determined by the cycle distribution module 202. For instance, the dynamic execution module 206 may direct the disk manager to fulfill the disk IO requests of a first queue for the allocated time interval of a disk IO cycle. Once the allocated time interval has ended, the dynamic execution module 206 may command the disk manager to terminate the processing of the disk IO requests in the first queue and perform a processing of the disk IO requests in the second queue for the allocated time interval, and so on and so forth until the disk IO cycle is complete. The dynamic execution module 206 may then repeat the processing for the next disk IO cycle.

The user interface API module 208 may include an API that enables a user to interact with the disk IO scheduler 200 via a user interface 210. For example, the user interface API module 208, in conjunction with user interface 210, may provide the user with the ability to change the criterion for the organization of disk IO requests into queues. The user interface 210 may include, but is not limited to, combinations of one or more of keypads, keyboards, mouse devices, touch screens, microphones, speech recognition packages, and other suitable devices or other electronic/software selection methods.

Exemplary Dynamic Disk IO Bandwidth Allocation

Figure 3:
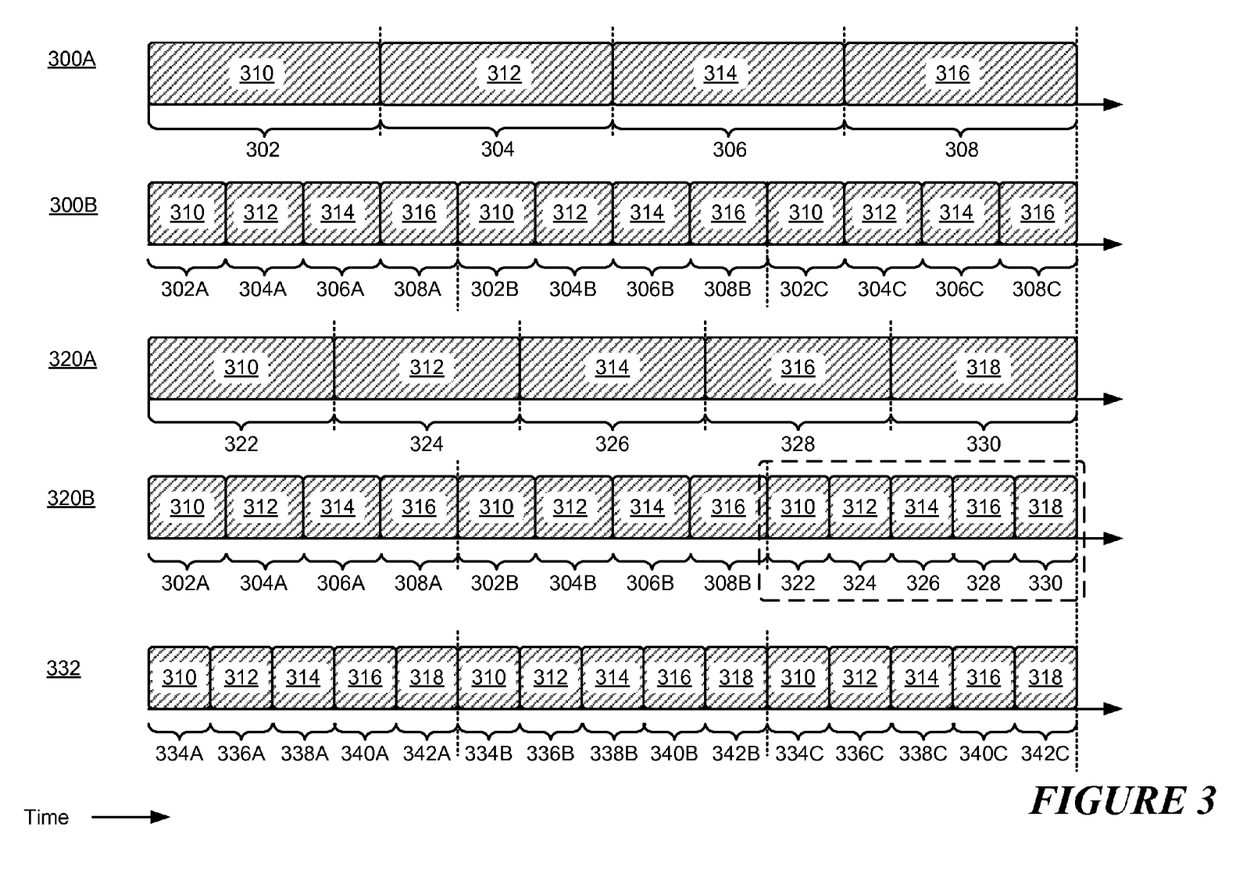
FIG. 3 is a block diagram illustrating the fair provision of input/output (IO) in a disk IO cycle to a plurality of queues, as well as the dynamically adjustment of the disk IO bandwidth provided to each queue, in accordance with at least one embodiment.

FIG. 3 is a block diagram illustrating the fair provision of input/output (IO) in a disk IO cycle to a plurality of queues, as well as the dynamic adjustment of the disk IO bandwidth provided to each queue, in accordance with at least one embodiment.

In embodiments where the disk IO cycles are serving a multi-user environment, the disk IO cycles, such as a disk IO cycle 300A, may be approximately, e.g., 120-150 milliseconds (ms) in duration. In contrast, disk IO cycles longer than 150 ms may cause a perception of delay to users in the multi-user environment.

In one instance, the disk IO scheduler 200 (FIG. 2) may be configured to allocate the disk IO cycle 300A into equal, or substantially equal disk IO time intervals 302-308 for the corresponding queues 310-316. The time intervals 302-308 are identical, or substantially identical, in duration. For example, if the duration of the disk IO cycle 300A is approximately 120 ms, the disk IO scheduler 200 may allocate the time intervals 302-308 so that each is approximately 30 ms. Each of the queues 310-316 may include different number of disk IO requests.

During the exemplary disk IO cycle 300A, the disk IO scheduler 200 may first provide disk IO bandwidth to the queue 310 for the duration of the time interval 302. During the duration of the time interval 302, the disk manager may process disk IO requests in the queue 310. The processing of the disk IO requests includes at least one of transferring data to and from a hardware data storage device based on each of the disk IO requests. At the end of the time interval 302, the disk IO scheduler 200 may command the disk manager to terminate the processing of the disk IO requests in the queue.

Subsequently, the disk IO scheduler 200 may provide disk IO bandwidth to the queue 312 for the time interval 304, before terminating the processing of the disk IO requests in the queue 312 when the time interval 304 expires. Likewise, the disk IO scheduler 200 may then provide disk IO bandwidth to the queue 314 for duration of the time interval 306, and to the queue 316 for the duration of the time interval 308. The end of the time interval 308 coincides with the conclusion of the disk IO cycle 300A. Subsequently, the disk IO scheduler 200 may initiate a new disk IO cycle. It will be appreciated that disk IO cycle 300A is meant to be illustrative rather than limiting. Thus, in various other embodiments, any number of queues may be processed in a disk IO cycle, and the number of equally, or substantially equal allocated time intervals is directly related to the number of queues being processed.

The ability of the disk IO scheduler 200 to further divide the time intervals 302-308 into time slices is illustrated with respect to the exemplary disk IO cycle 300B. The disk IO cycle has the same duration as the disk IO cycle 300A. As shown, the disk IO scheduler 200 may divide each of the time intervals 302-308 into a plurality of time slices. Specifically, the disk IO scheduler 200 may divide the time interval 302 into equal, or substantially equal, time slices 302A-302C. Likewise, the disk IO scheduler 200 may divide the time interval 304-308 into respective time slices.

For example, when the duration of the disk IO cycle 300B is approximately 120 ms, and each of the time intervals 302-308 is 30 seconds, time interval 302 may be further divided into thirds to create time slices that are 10 ms in duration. Moreover, the disk IO scheduler 200 may divide each of the other time intervals into the same number of slices. Accordingly, as shown, the disk IO scheduler 200 may similarly divide each of the time intervals 304-308 into three 10 ms time slices.

The disk IO scheduler 200 may be further configured to use the time slices of each time interval fairly during the disk IO cycle 300B. In other words, the disk IO scheduler 200 ensures that each of the queues 310-316 is provided with time slices of its allocated time interval in a "round robin" manner. For example, as illustrated in disk IO cycle 300B, the disk IO scheduler 200 may provide the queue 310 with a time slice 302A that belongs to the time interval 302. This provision of the time slice 302A enables queue 310 to process disk IO requests during the duration of the slice. Subsequently, the disk IO scheduler 200 may provide time slices 304A, 306A, and 308A of the corresponding time intervals 304-308 respectively to the queues 314-316. During each of the time slices 304A, 306A, 308A, the disk IO scheduler 200 may also cause the disk manager to process disk IO requests in each of the respective queues 312-316.

When the queues 310-316 are provided with a first round of time slices 302A, 304A, 306A, and 308A, the queues 310-316 are then provided with a second round of time slices 302B, 304B, 306B, and 308B, respectively. Additional time slices, such as time slices 302C, 304C, 306C, and 308C may be further provided in this "round robin" manner in sequence such that the queues are provided with the same number of time slices during each round for the processing of disk IO requests.

This equal, or substantially equal, division of the time intervals, as well as the "round robin" distribution of time slices to each queue, ensures that disk IO requests of each queue, such as each of the queues 310-316 are processed with greater but equal frequency. It will be appreciated that disk IO cycle 300B is meant to be illustrative rather than limiting. Thus, in various other embodiments, time intervals allocated to each queue may be divided into any number of time slices, provided that each of the time intervals is divided into approximately equal time slices, and the time slices of different time intervals are also approximately the same in duration.

The disk IO scheduler 200 may dynamically redistribute a disk IO cycle to accommodate one or more new queues that need disk IO bandwidth. For instance, the dynamic redistribution of a new disk IO cycle to accommodate a new queue is illustrated by disk IO cycle 320A. The exemplary disk IO cycle 320A has the same duration as the disk IO cycle 300A.

During or following a disk IO cycle, such as disk IO cycle 300A, the disk IO scheduler 200 may determine that an additional queue 318 needs disk IO bandwidth. Accordingly, the disk IO scheduler 200 may allocate the disk IO cycle 320A into equal, or substantially equal, time intervals 322-330. For example, if the duration of the disk IO cycle 320A is approximately 120 ms, the disk IO scheduler 200 may allocate the time intervals 322-330 so that each one is approximately 24 ms in duration. In comparison, as described above, each of the time intervals 302-208 has duration of approximately 30 ms.

The time intervals 322-328 correspond to the previously processed queues 310-316, while the time interval 330 corresponds to the additional queue 318. In various embodiments, the disk IO scheduler 200 may sequentially provide disk IO bandwidth to the queues 310-316, as well as queue 318, in a similar manner as during the disk IO cycle 320A. During each of the time slices 322-330, the disk IO scheduler 200 may be configured to cause the disk manager to process disk IO requests in each of the respective queues 310-318.

It will be appreciated that the dynamic redistribution of a disk IO cycle may also function in reverse when one or more queues ceases their need for disk IO bandwidth. For instance, the disk IO scheduler 200 may determinate that queue 318 no longer needs disk IO bandwidth during or following a disk IO cycle, such as disk IO cycle 320A. Accordingly, the disk IO scheduler 200 may adjust the next cycle from one that resembles disk IO cycle 320A into one that resembles disk IO cycle 300A.

In alternative embodiments where the disk IO scheduler 200 has divided one or more time intervals into a plurality of time slices, the disk IO scheduler 200 may also accommodate new queues via the redistribution of the time slices. For instance, the dynamic redistribution of time slices in a new disk IO cycle to accommodate a new queue is illustrated by the disk IO cycle 320B. The exemplary disk IO cycle 320B has the same duration as disk IO cycle 300B.

Initially, the disk IO scheduler 200 may ensure that each of the queues 310-316 is provided with time slices of its allocated time interval in a "round robin" manner that is previously described with respect to disk IO cycle 300B. As described, the disk IO scheduler 200 may provide the queue 310 with a time slice 302A that belongs to the time interval 302. This provision of the time slice 302A enables queue 310 to process disk IO requests during the duration of the slice. Subsequently, the disk IO scheduler 200 may provide time slices 304A, 306A, and 308A of the corresponding time intervals 304-308 respectively to the queues 312-316. During each of the time slices 302-308, the disk IO scheduler 200 may be configured to cause the disk manager to process disk IO requests in each of the respective queues 312-316. When the queues 312-316 are provided with a first round of time slices 302A, 304A, 306A, and 308A, the queues 312-316 are then provided with a second round of time slices 302B, 304B, 306B, and 308B, respectively.

However, at some point during the disk IO cycle 320B, the disk IO scheduler 200 may determine that an additional queue 318 needs disk IO bandwidth. Instead of initiating the provision of disk IO bandwidth in the next disk IO cycle, the disk IO scheduler 200 may convert the one or more remaining round of time slices to accommodate the new queue. In one embodiment, this conversion may be carried out by the cycle distribution module 202 of the disk IO scheduler 200.

For example, instead of providing another round of time slices that resemble the time slices 302C, 304C, 306C, and 308C of disk IO cycle 300B, the disk IO scheduler 200 may convert them into time slices 322-330 so that the queue 318 may immediately receive some disk IO bandwidth. In one embodiment, the total duration of the time slice 302B, 304B, 306B, and 308B is 40 ms, with each queue having approximately 10 ms time slices. Following the adjustment by the disk IO scheduler 200, the duration of the time slices 322-328 provided to each of the queue 310-316 is approximately 8 ms.

Further, the new queue 318 also receives a time slice 330 that is approximately 8 ms. It can nevertheless be readily seen that the total duration of the time intervals 322-330 is also approximately 40 seconds due to the redistribution made by the disk IO scheduler 200.

It will be appreciated that in other embodiments, the disk IO scheduler 200 may convert the one or more remaining rounds of time slices to accommodate any number of queues in a similarly manner. The conversion of one or remaining rounds of time slices to accommodate one or more new queues enables the new queues to receive immediate disk IO bandwidth, thus enhancing user perceived response time.

Following the disk IO cycle 320B, the disk IO scheduler 200 may initiate a disk IO cycle 332 that includes time intervals 334-342 for the queues 310-316, as well as the queue 318. Each of the time intervals 334-342 being divided equally or approximately equally into a plurality of corresponding time slices (e.g., time interval 334 divided into 334A, 334B, and 334C) and distributed to the queues 310-318 in a "round-robin" fashion. Thus, the disk IO scheduler 200 has adjusted a new cycle to completely accommodate queue 318 after a partial accommodation.

It will be appreciated that the dynamic redistribution of a disk IO cycle may also function in reverse for time slices when one or more queues ceases their need for disk IO bandwidth. For instance, the disk IO scheduler 200 may determinate that queue 318 no longer needs disk IO bandwidth during or following a disk IO cycle, such as disk IO cycle 320B. Accordingly, the disk IO scheduler 200 may adjust the next cycle from one that resembles disk IO cycle 332 into one that resembles disk IO cycle 300B. The adjustment may also occur in mid-cycle in a process that is reverse of the disk IO cycle 320B.

Figure 4:
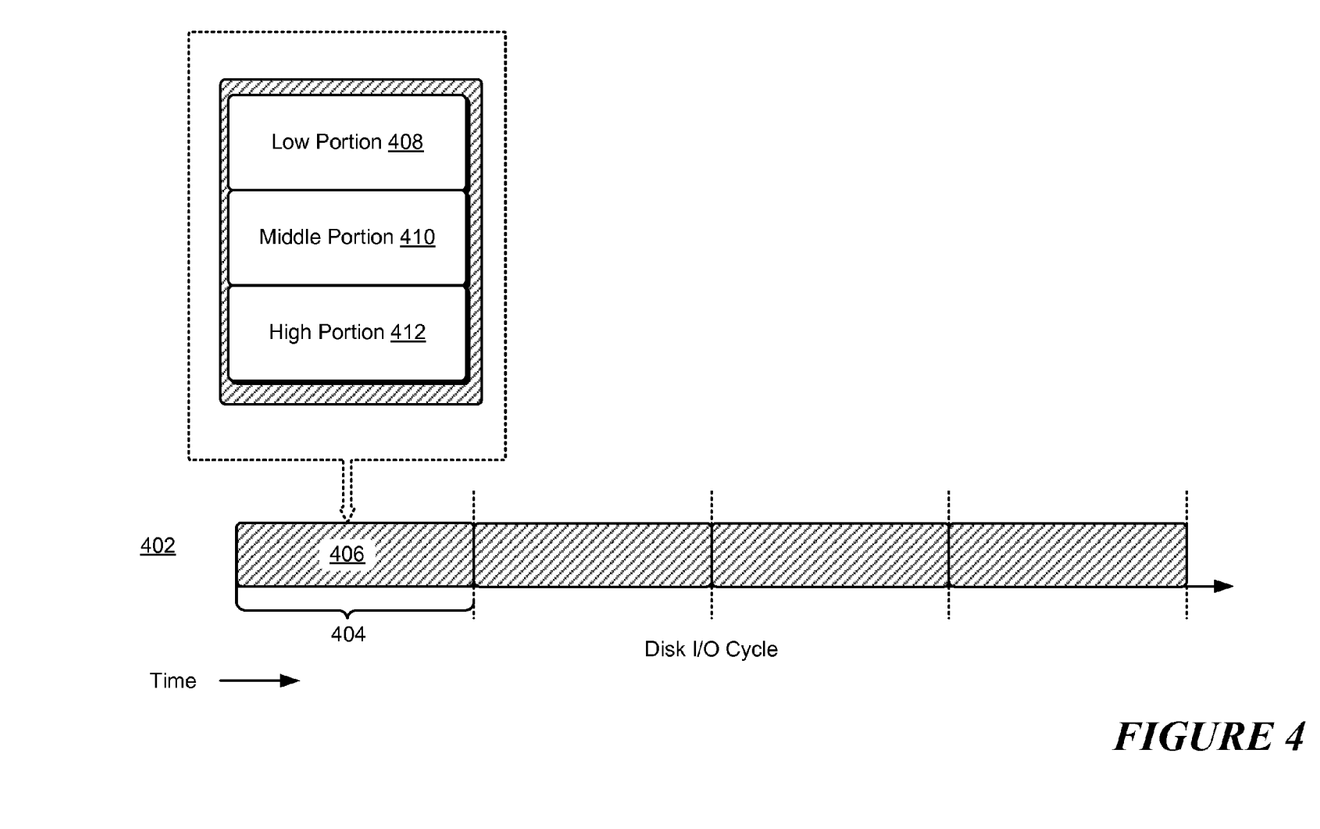
FIG. 4 illustrates the dynamic allocation of a disk input/output (IO) cycle using time intervals in conjunction with priority designation, in accordance with at least one embodiment.

FIG. 4 illustrates the dynamic allocation of disk IO using time intervals in a disk IO cycle 402 in conjunction with priority designation, in accordance with at least one embodiment of fair and dynamic disk IO bandwidth distribution. In some instances, the time period 404 may be an equally allocated time interval in the disk IO cycle 402. In other instances, the time period 404 may be a time slice in the disk IO cycle 402. The time period 404 may be provided to a queue, such as queue 406, so that one or more disk IO requests of the queue 406 are processed. The processing of the disk IO requests includes at least one of transferring data to and from a hardware data storage device based on each of the disk IO requests.

In various embodiments, the queue 406 may include a low portion 408, a middle portion 410, and a high portion 412. The disk IO requests grouped in queue 406 may be further sorted into each portion according to at least one secondary criterion. For example, the secondary criterion may be a priority rating assigned to each disk IO access request. The portions 408-410 are configured so that during the timer period 404, each portion receives a different allocation of the disk IO bandwidth. In one embodiment, the high portion 412 is configured to receive the highest allocation of the disk IO bandwidth, with the middle portion 410 and the low portion 308 respectively receiving decreasing amounts of disk IO bandwidth allocation. For instance, the disk IO requests in the high portion 412 may be able to transfer data to and from the hardware storage device using a bandwidth of approximately 700 megabytes (MB) per second during the time interval 404. On the other hand, the disk IO requests in the middle portion 410 may be allocated a bandwidth of approximately 200 MB per second, while the disk IO requests in the low portion 408 may be allocated a bandwidth of approximately 100 MB per second. In this way, disk IO requests that are grouped into the same queue may be further processed according to a secondary criterion.

Exemplary Processes

Figure 5:
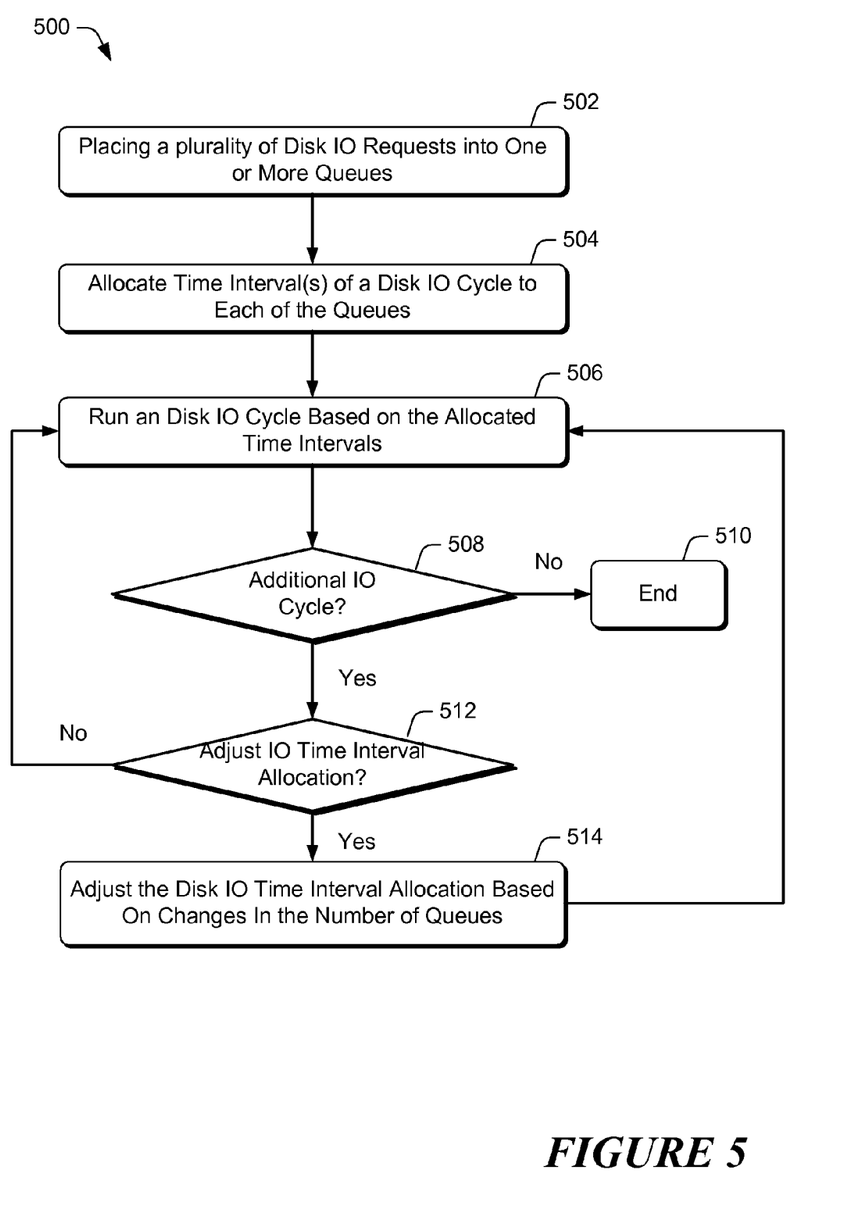
FIG. 5 is a flow diagram illustrating an exemplary process for the fair and dynamic provision of a disk input/output (IO) cycle to each queue, as well as dynamically adjusts the disk IO bandwidth provided to each queue, in accordance with ant least one embodiment.
Figure 6:
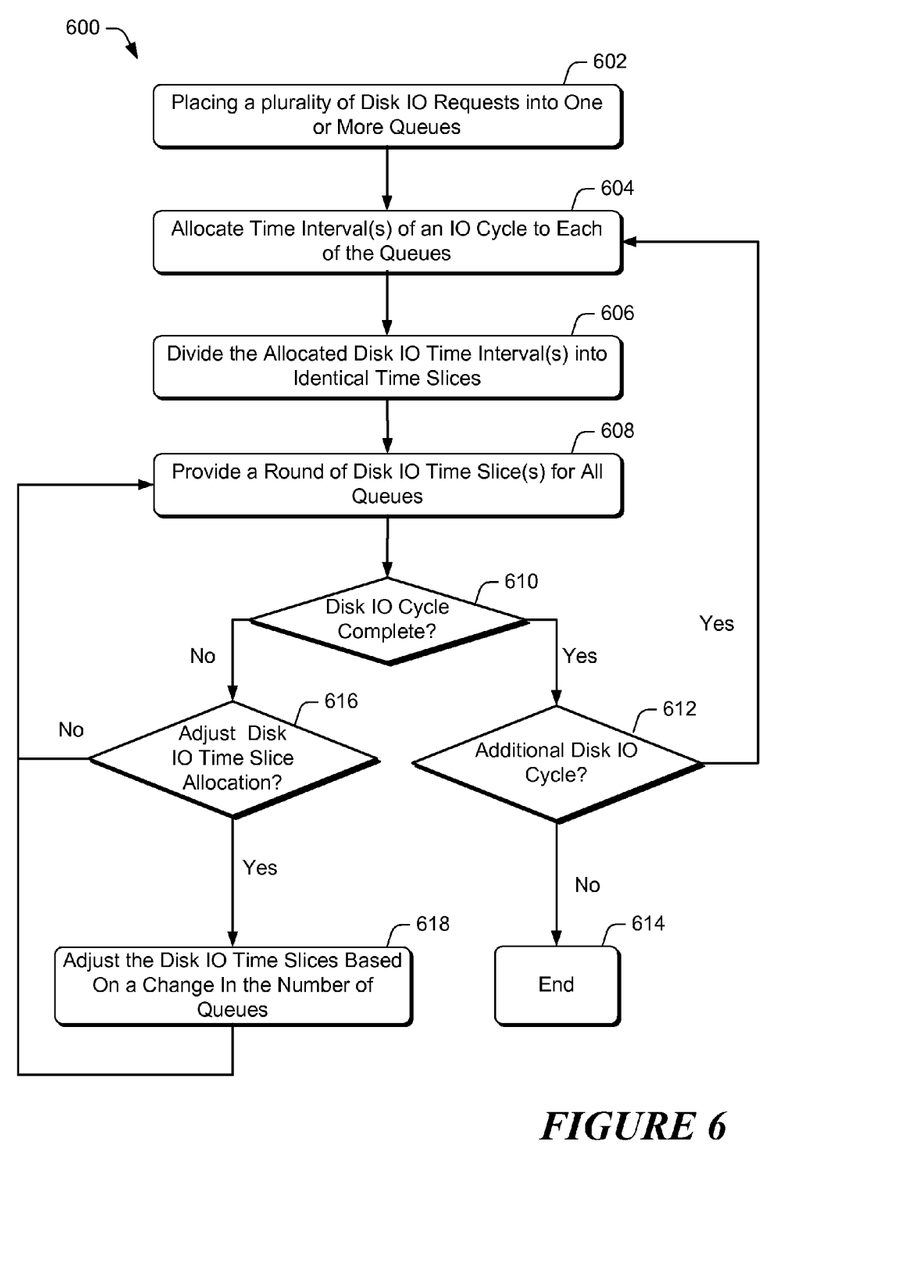
FIG. 6 is a flow diagram illustrating an exemplary process for the dynamic distribution of a disk input/output (IO) cycle to each of a plurality of queues in multiple time slices, in accordance with at least one embodiment.

FIGS. 5-6 illustrate exemplary processes that facilitate the implementation of differentiated access to networked resources, in accordance with one or more embodiments. The exemplary processes in FIGS. 5-6 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the disk IO scheduler 200 of FIG. 2, although they may be implemented in other disk IO scheduler architectures.

FIG. 5 is a flow diagram illustrating an exemplary process 500 for the fair and dynamic provision of disk input/output (IO) bandwidth to each queue. Additionally, the dynamic adjustment of the disk IO bandwidth provided to each queue, in accordance with various embodiments, is also illustrated. At block 502, the disk IO scheduler 200 may group a plurality of disk IO requests into queues according to one or more classification criteria. In the case of a multi-user environment, the disk IO scheduler 200 may group the disk IO requests according to the user each disk IO request serves.

In other embodiments, the disk IO scheduler 200 may group the disk IO requests according to additional classification criteria, such as whether the disk IO requests act on multimedia content or non-multimedia content. At block 504, the disk IO scheduler 200 may allocate a disk IO cycle to each of the queues. According to various embodiments, the disk IO cycle may be distributed equally among the queues, such that the duration disk IO time interval distributed to each queue is identical or substantially identical. At block 506, the disk IO scheduler 200 may run a disk IO cycle based on the allocated time intervals. In one embodiment, the disk IO scheduler 200 may sequentially provide disk IO bandwidth to each of the queue for the duration of the allocated time intervals until the disk IO cycle is completed.

At decision block 508, the disk IO scheduler 200 may determine whether another disk IO cycle is to be performed. If the disk IO scheduler 200 determines that no further disk IO cycles are to be performed ("no" at decision block 508), the process 500 may terminate at block 510. However, if the disk IO scheduler 200 determines that an additional disk IO cycle is to be performed ("yes" at decision block 508), the process 500 may proceed to decision block 512.

At decision block 512, the disk IO scheduler 200 may determine whether an adjustment to the disk IO cycle allocations are necessary, such as due to an increase or decrease in the number of queues that need disk IO bandwidth. If the disk IO scheduler 200 determines that the disk IO bandwidth allocation should not be adjusted ("no" at decision block 512), the process 500 may loop back to block 506, where a disk IO cycle based on the allocated disk IO bandwidth intervals may be performed again for the queues. However, if the disk IO scheduler 200 determines that the disk IO bandwidth allocation should be adjusted ("yes" at decision block 512), the process 500 may proceed to block 514.

At block 514, the disk IO scheduler 200 may adjust the allocation of the disk IO cycle based on changes in the number of queues that need disk IO bandwidth. According to various embodiments, increases or decreases in the number of queues may change the duration of the time intervals assigned to each queue. However, each of the time interval durations nevertheless remains equal or substantially equal to the other time interval durations. Thus, a fair round robin distribution of disk IO bandwidth may be implemented regardless of the number queues. Once the disk IO scheduler 200 has made the appropriate adjustment to the allocation of the time intervals in the disk IO cycle, the process 500 may loop back to block 506, where a disk IO cycle based on the allocated disk IO bandwidth intervals may be performed again for the queues.

FIG. 6 is a flow diagram illustrating an exemplary process 600 for the dynamic distribution of disk IO bandwidth to each of a plurality of queues in multiple time slices, in accordance with at least one embodiment. At block 602, the disk IO scheduler 200 may group a plurality of disk IO requests into queues according to one or more classification criteria. In the case of a multi-user environment, the disk IO scheduler 200 may group the disk IO requests according to the user each disk IO request serves.

In other embodiments, the disk IO scheduler 200 may group the disk IO requests according to additional classification criteria, such as whether the disk IO requests act on multimedia content or non-multimedia content. At block 604, the disk IO scheduler 200 may allocate a disk IO cycle to each of the queues. According to various embodiments, the disk IO cycle may be distributed equally, or substantially equally, among the queues, such that the duration disk IO time interval distributed to each queue is identical or substantially identical.

At block 606, the disk IO scheduler 200 may divide each of the one or more allocated time intervals into disk IO time slices. In various embodiments, each of the time intervals may be divided so that the time slices are identical or substantially identical in duration. Moreover, in some embodiments, the time slices from different time intervals are also equal or approximately equal in duration. In this way, the disk IO scheduler 200 may increase the frequency that each queue of disk IO requests are process, as well as ensure the fair allocation of disk IO bandwidth to each of queues.

At block 608, the disk IO scheduler 200 may provide a round of disk IO time slices for all the queues. In other words, each of queues is provided with one disk IO time slice that makes up its respective time interval. During each disk IO time slice, the disk IO scheduler 200 may command the disk manager to process the disk IO requests in each respective queue. The processing of the disk IO requests includes at least one of transferring data to and from a hardware data storage device based on each of the disk IO requests.

At decision block 610, the disk IO scheduler 200 may determine whether the disk IO cycle is complete. If the disk IO cycle is complete ("yes" at decision block 610), the process 600 may proceed to decision block 612. At decision block 612, the disk IO scheduler 200 may determine whether an additional disk IO cycle is to be performed. If the disk IO scheduler 200 determines that no further disk IO cycles are to be performed ("no" at decision block 612), the process 600 may terminate at block 614. On the other hand, if the disk IO scheduler 200 determines that an additional disk IO cycle is to be performed ("yes" at decision block 614), the process 600 may loop back to block 604, where a new disk IO cycle that includes time intervals provided to the one or more queues.

Returning to decision block 610, if the disk IO scheduler 200 determines that the disk IO cycle is not complete ("no" at decision block 610), the process 600 may proceed to decision block 616. At decision block 616, the disk IO scheduler 200 may determine whether the divided disk IO time slices are to be adjusted. For example, the divided disk IO time slices may be adjusted to accommodate one or more new queues that include disk IO access requests. Alternatively, the divided disk IO time slices may be adjusted when one or more queues are terminated.

If the disk IO scheduler 200 determines that the divided disk IO time slices are to be adjusted ("yes" at decision block 161), the disk IO scheduler 200 may adjust the time slices based on a change in the number of queues at block 618. For example, the disk IO scheduler 200 may detect that a new queue that includes disk IO requests, and adjust the time slices in a manner similar to as shown in disk IO cycle 320B (FIG. 3) to accommodate the new queue. Once the time slices are adjusted, the process 600 may loop back to block 608 where the disk IO scheduler 200 may provide a round of disk IO time slices for all the queues based on the adjustment. During each disk IO time slice, the disk IO scheduler 200 may command the disk manager to process the disk IO requests in each respective queue.

However, if the disk IO scheduler 200 determines that adjustments to the divided disk IO time slices are not necessary ("no" at decision block 616), the process 600 may directly loop back to block 608 where the disk IO scheduler 200 may provide a round of disk IO time slices for all the queues based on the adjustment.

It will be appreciated that the dynamic allocation of disk IO bandwidth, as shown, is meant to be illustrative rather than limiting. In other embodiments, the dynamic allocation of disk IO bandwidth may be implemented in alternative processes.

Exemplary Computing Environment

Figure 7:
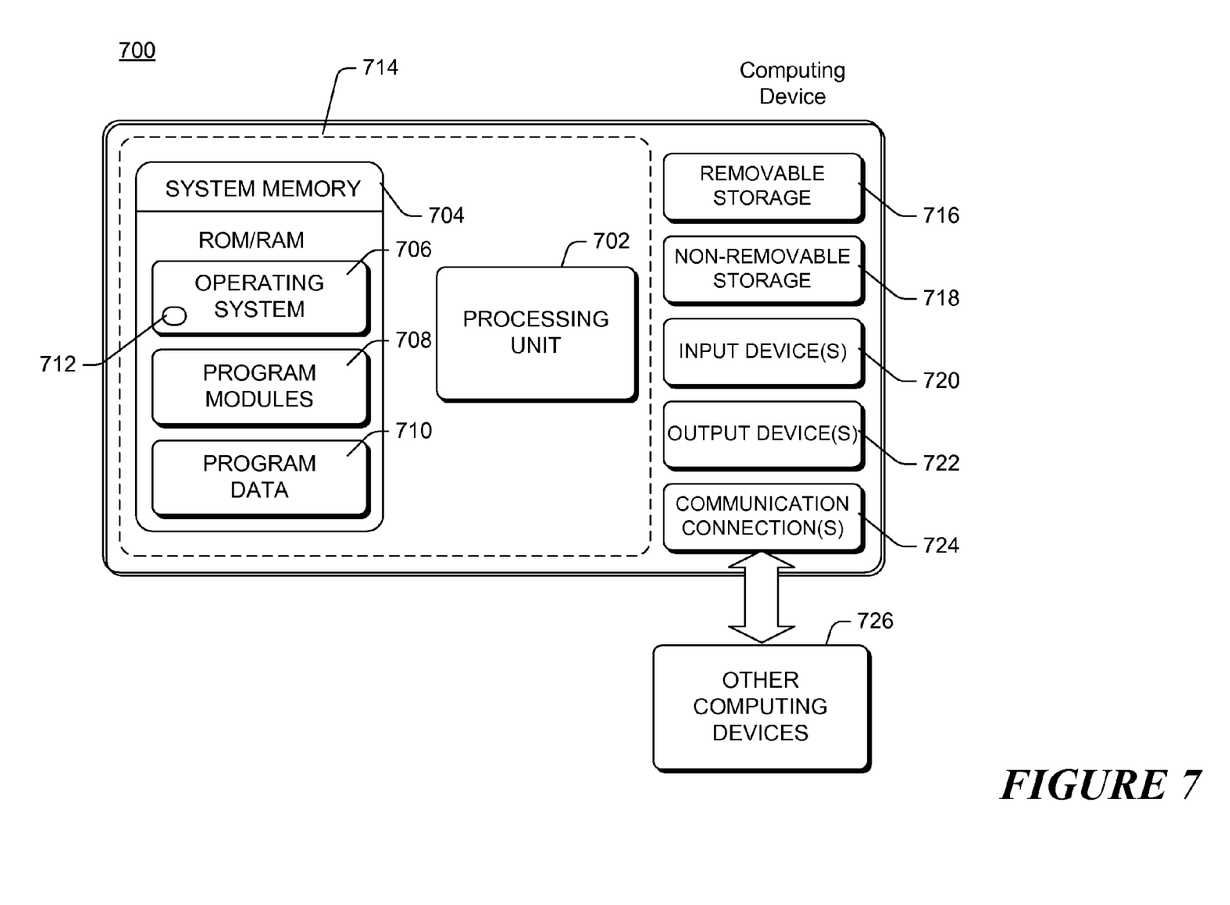
FIG. 7 is a block diagram illustrating a representative computing environment, in accordance with at least one embodiment.

FIG. 7 illustrates a representative computing device 700 that may be used to implement the fair and dynamic distribution of disk IO bandwidth to each of a plurality of queues that includes disk IO access requests. For example, the disk IO scheduler 200 (FIG. 2) may be implemented on the representative computing device 700 to control the data transfer to and from at least one of the removable storage 716 and non-removable storage 718. However, it is readily appreciated that the various embodiments of the fair and dynamic disk IO bandwidth distribution techniques and mechanisms may be implemented in other computing devices, systems, and environments. The computing device 700 shown in FIG. 7 is only one example of a computing device and is not intended to suggest any limitation as to the scope of use or functionality of the computer and network architectures. Neither should the computing device 700 be interpreted as having any dependency or requirement relating to any one or combination of components illustrated in the example computing device.

In a very basic configuration, computing device 700 typically includes the at least one processing unit 702 and system memory 704. Depending on the exact configuration and type of computing device, system memory 704 may be volatile (such as RAM), non-volatile (such as ROM, flash memory, etc.) or some combination of the two. System memory 704 typically includes an operating system 706, one or more program modules 708, and may include program data 710. The operating system 706 include a component-based framework 712 that supports components (including properties and events), objects, inheritance, polymorphism, reflection, and provides an object-oriented component-based application programming interface (API), such as, but by no means limited to, that of the .NET™ Framework manufactured by Microsoft Corporation, Redmond, Wash. The device 700 is of a very basic configuration demarcated by a dashed line 714. Again, a terminal may have fewer components but will interact with a computing device that may have such a basic configuration.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by removable storage 716 and non-removable storage 718. Computer storage media may include volatile and nonvolatile, removable and non-removable media implemented in any method or technology for storage of information, such as computer readable instructions, data structures, program modules, or other data. System memory 704, removable storage 716 and non-removable storage 718 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 720 such as keyboard, mouse, pen, voice input device, touch input device, etc. Output device(s) 722 such as a display, speakers, printer, etc. may also be included. These devices are well know in the art and are not discussed at length here.

Computing device 700 may also contain communication connections 724 that allow the device to communicate with other computing devices 726, such as over a network. These networks may include wired networks as well as wireless networks. Communication connections 724 are one example of communication media. Communication media may typically be embodied by computer readable instructions, data structures, program modules, etc.

It will be appreciated that the illustrated computing device 700 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The provision of fair and dynamic distribution of disk IO bandwidth to a plurality of queues, such as queues of disk IO requests servicing software applications running in a multi-user environment, may maximize disk IO bandwidth usage while serving to enhance user experience. For example, the fair and dynamic distribution of disk IO bandwidth to queues may ensure that no application serving a first user is starved of disk IO bandwidth due to an application serving another user consuming a disproportionate amount of disk IO bandwidth. Thus, embodiments in accordance with this disclosure may diminish delays and hesitations that users may experience while using applications.

CONCLUSION

In closing, although the various embodiments have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

The invention claimed is:

1. A method, comprising:
   organizing one or more disk input/output (IO) requests into one or more queues;
   allocating a corresponding disk IO time interval to each queue by equally distributing a disk IO cycle based on a quantity of the one or more queues;
   dividing a queue into a least a first portion and a second portion; and
   processing the one or more disk IO requests in each queue during the corresponding disk IO time interval of each queue, such that a disk IO request of an application in the first portion of the queue uses a higher portion of an allocated bandwidth during a disk IO time interval allocated to the queue than an additional disk IO request of an additional application in the second portion.

2. The method of claim 1, wherein the organizing of one or more disk IO requests includes organizing one or more disk IO requests that serve each user into a corresponding queue.

3. The method of claim 1, further comprising adjusting the allocated disk IO time intervals based on a change in the quantity of the one or more queues.

4. The method of claim 1, further comprising dividing the disk IO time interval allocated to each queue into identical time slices, wherein the duration of a disk IO time slice of one of the queues is identical in duration to a time slice from each of the other queues.

5. The method of claim 4, wherein the processing includes processing the one or more disk IO requests in each queue during a corresponding time slice.

6. The method of claim 4, further comprising re-dividing the disk IO time interval allocated to each queue into identical additional time slices based on a change in the quantity of one or more queues, wherein the duration of a disk IO time slice of one of the queues is identical in duration to a time slice from each of the other queues.

7. The method of claim 1, wherein the disk IO requests include IO request packets (IRPs).

8. The method of claim 1, wherein the processing of the one or more disk IO requests includes at least one of transferring data to and from a hardware data storage device based on the one or more disk IO requests.

9. A computer storage medium having computer-executable instructions that, when executed, perform acts comprising:
   organizing one or more disk input/output (IO) requests into one or more queues;
   allocating a corresponding disk IO time interval to each queue by equally distributing a disk IO cycle based on a quantity of the one or more queues;
   dividing the disk IO time interval allocated to each queue into identical time slices, wherein the duration of a disk IO time slice of one of the queues is identical in duration to a time slice from each of the other queues;
   processing the one or more disk IO requests in each queue during a corresponding time slice;
   re-dividing the disk IO time interval allocated to each queue into identical additional time slices based on a change in the quantity of one or more queues, wherein the duration of a disk IO time slice of one of the queues is identical in duration to a time slice from each of the other queues; and
   processing the one or more disk IO requests in each queue during a corresponding additional time slice.

10. The computer storage medium of claim 9, further comprising processing the one or more disk IO requests in each queue during another corresponding time slice.

11. The computer storage medium of claim 9, wherein the organizing of one or more disk IO requests includes organizing one or more disk IO requests that serve each user into a corresponding queue.

12. The computer storage medium of claim 9, further comprising dividing at least one queue into at least a first portion and a second portion, wherein a disk IO request of an application in the first portion uses a higher portion of an allocation disk IO bandwidth during the corresponding disk IO time interval than an additional disk IO request of an additional application in the second portion.

13. The computer storage medium of claim 9, wherein the disk IO requests include IO request packets (IRPs).

14. The computer storage medium of claim 9, wherein the processing of the one or more disk IO requests includes at least one of transferring data to and from a hardware data storage device based on the one or more disk IO requests.

15. A system, comprising:
    one or more processors; and
    memory allocated to store a plurality of computer-executable instructions for execution by the one or more processors, the computer-executable instructions comprising:
      organizing one or more disk input/output (IO) requests into one or more queues based on a criterion;
      dividing a queue into at least a first portion or a second portion;
      allocating a corresponding disk IO time interval to each queue by equally distributing a disk IO cycle based on a quantity of the one or more queues; and
      processing the one or more disk IO requests in each queue during the corresponding disk IO time interval of each queue, such that a disk IO request of an application in the first portion of the queue uses a higher portion of an allocated bandwidth during a particular disk IO time interval allocated to the queue than an additional disk IO of an additional application in the second portion.

16. The system of claim 15, the computer-executable instructions further comprising adjusting the allocated disk IO time intervals based on a change in the quantity of the one or more queues.

17. The system of claim 15, the computer-executable instructions further comprising dividing the disk IO time interval allocated to each queue into identical time slices, wherein the duration of a disk IO time slice of one of the queues is identical in duration to a time slice from each of the other queues.

18. The system of claim 15, wherein the processing of the one or more disk IO requests includes at least one of transferring data to and from a hardware data storage device based on the one or more disk IO requests.

19. The system of claim 15, the computer-executable instructions further comprising an application program interface (API) that enables a user to change the criterion.

20. The system of claim 15, wherein each queue includes a plurality of IO requests that serve a single user.

* * * * *